US012619001B2

(12) United States Patent
Vos et al.

(10) Patent No.: US 12,619,001 B2
(45) Date of Patent: May 5, 2026

(54) REGIONALIZED CLIMATE MODELS USING PHYSICS-INFORMED NEURAL NETWORKS

(71) Applicant: INTERNATIONAL BUSINESS MACHINES CORPORATION, Armonk, NY (US)

(72) Inventors: Etienne Eben Vos, Johannesburg (CA); Campbell D Watson, Brooklyn, NY (US); Alberto Costa Nogueira Junior, Sao Paulo (BR); Bianca Zadrozny, Rio de Janeiro (BR); Komminist Weldemariam, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 784 days.

(21) Appl. No.: 17/302,077

(22) Filed: Apr. 23, 2021

(65) Prior Publication Data

US 2022/0342115 A1 Oct. 27, 2022

(51) Int. Cl.
| | |
|---|---|
| *G01W 1/10* | (2006.01) |
| *G06F 17/13* | (2006.01) |
| *G06N 3/04* | (2023.01) |
| *G06N 3/063* | (2023.01) |
| *G06N 3/08* | (2023.01) |

(52) U.S. Cl.
CPC .............. *G01W 1/10* (2013.01); *G06F 17/13* (2013.01); *G06N 3/04* (2013.01); *G06N 3/063* (2013.01); *G06N 3/08* (2013.01)

(58) Field of Classification Search
CPC ....... G01W 1/10; G06F 17/13; G06N 3/0442; G06N 3/0455
See application file for complete search history.

(56) References Cited

U.S. PATENT DOCUMENTS

| | | | |
|---|---|---|---|
| 10,754,063 | B2 | 8/2020 | Lakshmanan |
| 10,996,374 | B1 * | 5/2021 | Nazir ........................ G06N 7/01 |
| 12,461,273 | B2 * | 11/2025 | Lathrop ................... G06N 3/04 |
| 2013/0110399 | A1 | 5/2013 | Moss |
| 2024/0160923 | A1 * | 5/2024 | Price ........................ G06N 3/08 |

FOREIGN PATENT DOCUMENTS

| | | |
|---|---|---|
| CN | 105740991 B | 4/2020 |

OTHER PUBLICATIONS

Mohan et al. ("A Deep Learning based Approach to Reduced Order Modeling for Turbulent Flow Control using LSTM Neural Networks", 2018, Mechanical and Aerospace Engineering, The Ohio University, Columbus, OH) (Year: 2018).*

(Continued)

*Primary Examiner* — Ricky Go
(74) *Attorney, Agent, or Firm* — Anthony Curro

(57) ABSTRACT
A method, a computer system, and a computer program product for regionalized climate models is provided. Embodiments of the present invention may include selecting a class of a reduced order model. Embodiments of the present invention may include building a neural network in a reduced order space. Embodiments of the present invention may include recovering full state dynamics. Embodiments of the present invention may include training a model. Embodiments of the present invention may include providing an output.

15 Claims, 6 Drawing Sheets

(56) References Cited

OTHER PUBLICATIONS

P.R. Vlachas et al. ("Backpropagation algorithms and Reservoir Computing in Recurrent Neural Networks for the forecasting of complex spatiotemporal dynamics," 2020, Neural Networks, vol. 126, pp. 191-217) (Year: 2020).* https://www.datarobot.com/blog/introduction-to-loss-functions/ (Year: 2018).*

Brunton et al., "Discovering governing equations from data: Sparse identifiction of nonlinear dynamical systems", SparseDynamics_bw, Feb. 9, 2016, 7 pages.

Champion et al., "Autoencoders for discovering coordinates and dynamics from data", NASA/ADS, Nov. 2019, https://ui.adsabs.harvard.edu/abs/2019APS..DFDP10006C/abstract, 2 pages.

Chen et al. "Physics-informed machine learning for reduced-order modeling of nonlinear problems", Preprint submitted to Journal of Computational Physics, Jul. 23, 2020, ResearchGate, 27 pages.

Jin et al., "NSFnets (Navier-Stokes Flow nets): Physics-informed neural networks for the incompressible Navier-Stokes equations", arXiv:2003.06496v1 [physics.comp-ph] Mar. 13, 2020, 35 pages.

Junior et al., "Reduced order modeling of dynamical systems using artificial neural networks applied to water circulation", International Conference on High Performance Computing, Conference Paper, First Online: Oct. 20, 2020, 21 pages.

Liu et 1., "Latent Space Cartography: Visual Anaylsis of Vector Space Embeddings", Eurographics Conference on Visualization (EuroVis) 2019, vol. 38, No. 3, 12 pages.

Loeve, "Graduate Texts in Mathematics", Probability Theory I, 4th edition, Originally published by Springer-Verlag New York in 1977, 437 pages.

Tapiador et al., "Global precipitation measurements for validating climate models", Atmospheric Research, 197, (2017), pp. 1-20, Elsevier.

Mell et al., "The NIST Definition of Cloud Computing", Recommendations of the National Institute of Standards and Technology, Special Publication 800-145, Sep. 2011, 7 pages.

* cited by examiner

100

200

300

Select Class of Reduced Order Model 302

Build Neural Network in Reduced Order Space 304

Recover Full State Dynamics 306

Train Model 308

Provide Output 310

900

902a, b
Internal Components 904a, b
External Components

906 PROCESSOR(S)  912

908 RAM(S)

910 ROM(S)

COMPUTER READABLE
STORAGE MEDIA  915
– OPERATING SYSTEM(S)  914
– APPLICATION PROGRAMS  915

916

930 DEVICE DRIVERS

918 R/W DRIVE OR INTERFACE

922 NETWORK ADAPTER OR INTERFACE

924

926

928

PORTABLE COMPUTER READABLE STORAGE MEDIA  920

TO NETWORK

1000

REGIONALIZED CLIMATE MODELS USING PHYSICS-INFORMED NEURAL NETWORKS

BACKGROUND

The present invention relates generally to the field of computing, and more particularly to machine learning. Extreme weather changes and impacts on the climate are increasing in the amount of changes that are occurring and in the complexity of weather patterns. Climate extremes can affect weather conditions and climate variability, both of which can have significant impacts on businesses and regions.

SUMMARY

Embodiments of the present invention disclose a method, a computer system, and a computer program product for regionalized climate models. Embodiments of the present invention may include selecting a class of a reduced order model. Embodiments of the present invention may include building a neural network in a reduced order space. Embodiments of the present invention may include recovering full state dynamics. Embodiments of the present invention may include training a model. Embodiments of the present invention may include providing an output.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
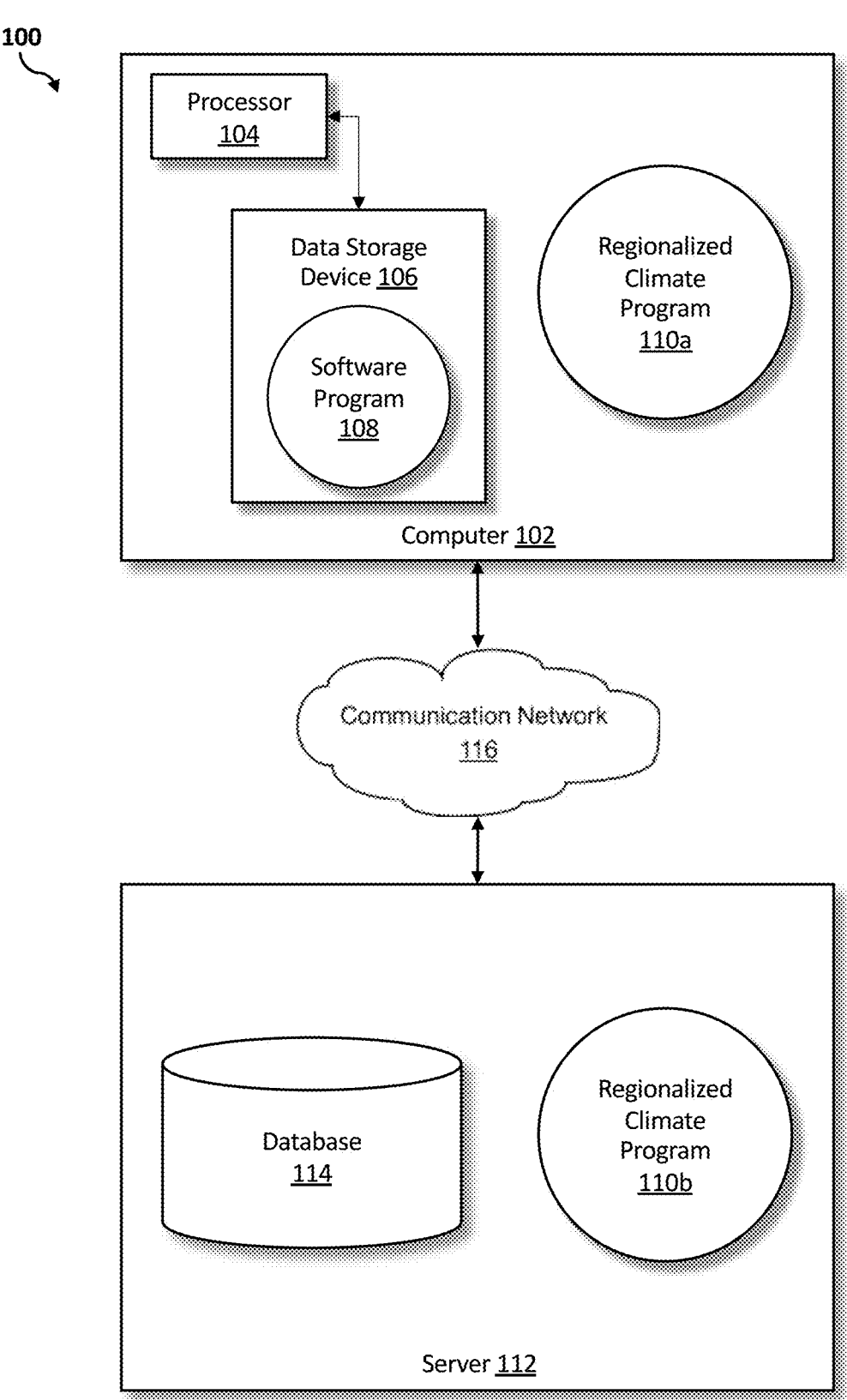
FIG. 1 illustrates a networked computer environment according to at least one embodiment.

Detailed embodiments of the claimed structures and methods are disclosed herein, however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

As previously described, extreme weather changes and impacts on the climate are increasing in the amount of changes that are occurring and in the complexity of weather patterns. Climate extremes can affect weather conditions and climate variability, both of which can have significant impacts on businesses and regions. Higher-fidelity regional climate models now exist, such as models with 1-10 km grid spacing, that offer some improvement to local climates. However, the current models have some critical issues, such as systematic errors in global climate models propagated into regional climate models due to a requirement of calibration of many model parameters. Another issue may include computational expenses that make the models impractical for high-impact climate resilience studies that require large sets of forecasts for uncertainty quantification and confidence scoring.

Surrogate models for fluid dynamics exist but these models present a unique challenge due to compressibility and having phase changes, such as from a gaseous state of water to a liquid state of water with resulting energy transfers. The fluid dynamics and phase changes are significantly more complicated than an incompressible Navier-Stokes computation. Current surrogate models for complex fluid flows, such as sparse identification of nonlinear dynamics (SINDy) make assumptions about or need to know the governing equations of the physical phenomenon that limits the model's applicability to very complex systems.

Physics-informed machine learning or artificial intelligence regional climate models solve computationally extensive calculations and cost a significant amount of money to build and operate. However, the current regional climate models may have unresolved issues, some include limitations on the model grid resolution and unsolved important sub-grid processes, such as turbulence and cloud convection. Additionally, the long computational time for physics-based climate models limit the ability for uncertainty quantification and exploration of how adaption measures can impact the future climate. Therefore, it may be advantageous to, among other things, provide new systems, methods and program products to intelligently regionalize climate models by creating advanced use of physics-informed neural networks.

The following described exemplary embodiments provide a system, a method and a program product for physics-informed machine learning. As such, embodiments of the present invention have the capacity to improve the technical field of physics-informed machine learning by creating improved regionalized climate models using physics-informed neural networks in the latent space. More specifically, a non-linear reduced order model or autoencoder is paired with a neural network in the latent space and with physics-informed partial differential equation (PDE) constraints. The created system, method and program product for physics-informed machine learning represents translating and visualizing the outputs of regionalized predictions and extremes for downstream impact models using dynamically created ontologies and knowledge graphs, such as the use of neuro-symbolic artificial intelligence.

According to an embodiment, a physics-informed artificial intelligence-based regional climate model may be built to emulate, as the use case provided herein, a climate system at high fidelity. The physics-informed artificial intelligence-based regional climate model may be trained using high fidelity weather and climate simulations. The physical constraints may be used to train the model and may ensure the model is retaining awareness of the physical system beyond interpolating between data points.

The regional climate model may perform rapid simulations. For example, estimates of the speedup of regional climate model simulations may be derived from a recent study of blood flow simulation using physics-informed artificial intelligence. The study identified a 2400× speedup compared to traditional simulation methods. Fast simulations may enable many scenarios to be generated, thus, fast simulations may enable a two-way interaction with downstream models and applications. For example, a physics-inspired downscaling of weather and climate models provide improved regionalized weather and climate information, short-term deterministic predictions with appropriate initial boundary conditions and long-term statistics that match the climate system.

Interpreting or understanding climate extremes and the ability to predict the impact of extreme weather will assist in developing highly effective climate-aware computing applications. The improved climate-aware computing applications and programs may enable resilient decision capabilities and policies for many industries or domains, such as supply chain, weather services, climate risk services, coastal infrastructure services, financial services, non-profit services, government services, legal services and technology services.

A regional climate model may be used for and during many phases of supply chain and logistics. For example, the pre-production phase, the production phase, the distribution phase and the end user or client consumption phase. Extreme weather patterns, such as floods, droughts or tropical cyclones have brought focus to supply chains and anticipating when regions may have extreme weather patterns that will benefit supply chain management. Many companies may be aware of climate related hazards and may be well informed about potential exposure to hazardous conditions, however, many lack an understanding of the vulnerability of alternate sourcing plans. The regional climate models or the regional climate program may provide an opportunity to bring an understanding to quantifying (e.g., fulfilling orders or sourcing critical components) the extreme climate events.

According to an embodiment, a regionalized climate program, system and method may learn the dynamics, such as weather phase changes, complex fluid flows or physical phenomenon in a reduced order space using a non-intrusive formulation. A non-intrusive formulation may make no assumptions about governing equations, which is important when the governing equations are non-tractable (i.e., complex or too complex), as they are for climate data.

Various types of machine learning models may be built and used to create predictive analytics and results for the various industries. The industry or domain provided herein as a use case is creating predictive data for extreme weather and climate events. Industries other than regionalized climate data predictions may include, for example, supply chain, medical, retail, entertainment, social media, business, technology, academic, government, industrial, legal or automotive. Machine learning models may also include deep learning models and artificial intelligence models.

Machine learning models may also include deep learning models, neural networks and artificial intelligence models. Training and updating a model may include supervised, unsupervised and semi-supervised machine learning procedures. Supervised learning may use a labeled dataset or a labeled training set to build, train and update a model. Unsupervised learning may use all unlabeled data to train a model. Semi-supervised learning may use both labeled datasets and unlabeled datasets to train a model.

A neural network may be a component of deep learning. A neural network may be related to or known as a deep network or a deep neural network. A neural network may interpret, label and classify raw data, such as unstructured data. A neuron in a deep neural network may combine input data and assign a weight to the input data based on a significance level of what the neural network is learning in order to classify the data. The deeper the neural network, the more neurons or node layers the input data passes through. A neuron, a node and a filter may be considered interchangeable terms. The neuron may represent the location that receives input data, produces and associates an input weight to the data and then determines, via a computation, if the data should continue or progress further in the network before the data is classified. Each layer of neurons may train the data based on the previous output layer. Autoencoders may be used as a type of neural network to ingest unsupervised data and to learn and encode the data. The autoencoder may learn how to represent ingested data as a dataset.

Deep learning is a type of machine learning that may classify information based on the training data. The training data may be structured data or unstructured data. Structured data may include data that is highly organized, such as a spreadsheet, relational database or data that is stored in a fixed field. Unstructured data may include data that is not organized and has an unconventional internal structure, such as a portable document format (PDF), an image, a presentation, a webpage, video content, audio content, an email, a word processing document or multimedia content. Deep learning may also be related to or known as hierarchical learning or deep structured learning.

Deep learning may map an input, classify data, interpret datasets and provide an output of data for one or more layers of data. Each layer of data may be represented as a node. A node may also be known as a neuron or an artificial neuron. Deep learning may detect similarities in data that may or may not be labeled. The deep learning models may provide, for example, a graph output that may be generated as nodes and edges relating to the domain specific taxonomy that is being learned.

Supervised learning and semi-supervised learning may incorporate feedback or ground truth by having an individual check the accuracy of the data, data labels and data classifications. Individuals are typically a subject matter expert who has extensive knowledge in the particular domain of the dataset. The subject matter expert input may represent ground truth for the model and the provided ground truth may raise the accuracy and the predictive capabilities of the model. The subject matter expert may correct, amend, update or remove the classification of the data or data labels by manually updating the labeled dataset. Using a subject matter expert to provide feedback to the model may improve the accuracy of the model as datasets are updated or corrected.

Referring to FIG. 1, an exemplary networked computer environment 100 in accordance with one embodiment is depicted. The networked computer environment 100 may include a computer 102 with a processor 104 and a data storage device 106 that are enabled to run a software program 108 and a regionalized climate program 110a. The networked computer environment 100 may also include a server 112 that is enabled to run a regionalized climate program 110b that may interact with a database 114 and a communication network 116. The computer 102 may also be known as a client computer and the server 112 may also be known as a server computer. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The computer 102 may communicate with the server 112 via the communications network 116. The communications network 116 may include connections, such as wire, wireless communication links, or fiber optic cables. As will be discussed with reference to FIG. 4, server 112 may include internal components 902*a* and external components 904*a*, respectively, and computer 102 may include internal components 902*b* and external components 904*b*, respectively. The server 112 may also operate in a cloud computing service model, such as Software as a Service (SaaS), Analytics as a Service (AaaS), Blockchain as a Service (BaaS), Platform as a Service (PaaS), or Infrastructure as a Service (IaaS). Server 112 may also be located in a cloud computing deployment model, such as a private cloud, community cloud, public cloud, or hybrid cloud. Computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the regionalized climate program 110*a*, 110*b* may interact with a database 114 that may be embedded in various storage devices, such as, but not limited to a computer/mobile device 102, a server 112, or a cloud storage service.

According to the present embodiment, a user operating a computer 102 or a server 112 (e.g., a server computer) may use the regionalized climate program 110*a*, 110*b* (respectively) to predict long-term realistic future climate conditions. The regionalized climate method is explained in more detail below with respect to FIGS. 2 and 3.

Figure 2:
FIG. 2 is a block diagram of example architecture for building a regionalized climate model using physics-informed neural networks in the latent space according to at least one embodiment.
Figure 2:
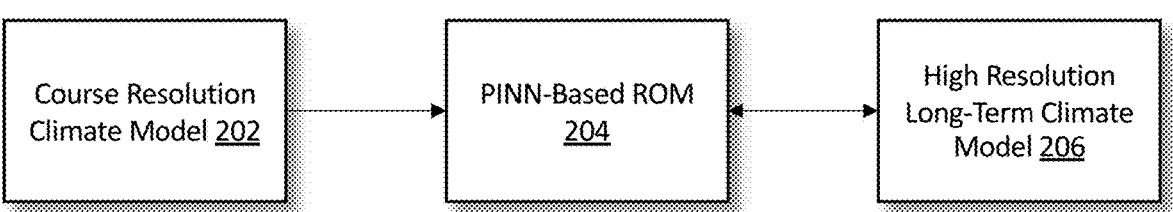
Figure 2:
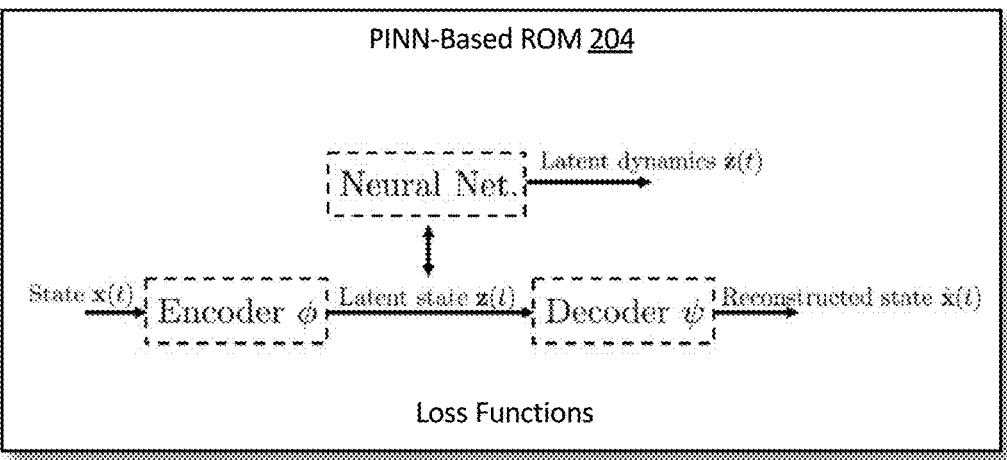

Referring now to FIG. 2, a block diagram of example architecture for building a regionalized climate model 200 using physics-informed neural networks in the latent space used by the regionalized climate program 110*a*, 110*b* according to at least one embodiment is depicted. The physics-informed neural network may include a deep learning model framework that solves forward and inverse weather and climate problems using nonlinear differential equations. A latent machine learning space may include compressed data representations when the represented data points are compressed to be shown closer in space. The architecture for building a regionalized climate model 200 may include a coarse resolution climate model 202, a PINN-based ROM 204 that includes loss functions and a high-resolution long-term climate model 206.

A coarse resolution climate model 202 may include a model that ingests or receives input data and provides variables in three dimensions as an output. For example, the input data that is provided to the coarse resolution climate model 202 includes temperature data, wind speed data, wind direction data, air pressure data, air density data, humidity data or precipitation data. The output data from the course resolution model are temperature data, wind speed data, wind direction data, air pressure data, air density data, humidity data or precipitation data that is presented over time in three dimensions, such as latitude, longitude and height.

A PINN-based ROM 204 may stand for a physics-informed neural network (PINN) based reduced order model or reduced order modeling (ROM). The PINN-based ROM 204 may ingest data, for example, global climate data, and may provide high-resolution outputs of the ingested data. The components in the PINN-based ROM 204 include a neural network, an encoder, a decoder and physics-informed constraints. The encoder ($\phi$) may receive a state $x(t)$ produced by the coarse resolution climate model 202 and may produce a latent state $z(t)$. The neural network may provide latent dynamics $\dot{z}(t)$ and may provide a latent space or data to the latent state $z(t)$. The decoder ($\psi$) may receive the latent state $z(t)$ and produce a reconstructed state $\hat{x}(t)$. The encoder ($\phi$) and the decoder ($\psi$) may select a type of reduced order model to use, such as a variational autoencoder or a principal component analysis (PCA). The neural network output of the latent dynamics $\dot{z}(t)$ may include an output time-series of target variables in the latent space.

The PINN-based ROM 204 may include an autoencoder (i.e., encoder ($\phi$) and decoder ($\psi$) with a neural network in a latent space. Typically, autoencoders, such as a sparse identification of nonlinear dynamics (SINDy) autoencoder performs a simultaneous discovery of reduced basis and parsimonious dynamics. The SINDy autoencoder produces effective coordinates and a parsimonious dynamical system model using linear sparse regression using a library of candidate terms.

The PINN-based ROM 204 improves the parsimonious dynamical system model using sparse regression by providing an autoencoder that replaces the sparse regression with a neural network. The neural network may include a fully connected neural network (i.e., a dense neural network), a long-short term memory (LSTM) reduced neural network, an echo state neural network or a liquid time-constant network. The neural network in the PINN-based ROM 204 is also improved by including physics informed constraints in the loss function of the full order state. The neural network may provide greater flexibility by allowing the neural network to learn a shape function without any assumptions or constraints. Alternatively, the SINDy architecture requires a priori information (i.e., constraints) about the shape function that describes the latent space dynamics, such as the parsimonious model.

Generalizing to a reduced order model (ROM) or further generalizing the reduced order model (ROM) may include allowing the autoencoder to use any classical numerical method to find the reduced order basis (i.e., latent space). For example, one method may use the principal component analysis, another method may use the Karhunen-Loeve decomposition and another method may use the spectral proper orthogonal decomposition. The generalizing procedures of the autoencoder may replace the full order model with a reduced order model (ROM). The generalizing procedures of the autoencoder may find the reduced order basis that ensures reliable evaluation of the partial differential equation (PDE) system at a substantially reduced computational cost.

A high-resolution long-term climate model 206 may predict long-term realistic climate statistics or may predict possible future states of the climate system. The high-resolution long-term climate model 206 may represent the reconstructed state $\hat{x}(t)$. For example, the reconstructed spatiotemporal prediction of target variables is produced, such as temperature, precipitation, wind speed and direction. The predictions include a realistic statistical distribution of future conditions that match long-term statistics. The predictions also include a deterministic prediction of future conditions if performing short-term weather forecasts.

The PINN-based ROM 204 may be an integral component in predicting the weather and climate conditions for both global and regional geographical areas. The global climate or the global climate system may target global circulation as simulated by a global climate model. For example, boundary conditions or features used are solar radiation, ocean and land surface processes or anthropogenic forcings, such as carbon dioxide, $CO_2$. The regional climate or the regional climate system may target regional circulation as simulated by a regional climate model. Data from a global model may be used to create predictions for a regional area. For example, boundary conditions or features are used from a global climate model, including ocean, land surface and anthropogenic forcings to create regional predictions.

The PINN-based ROM 204 may also be an integral component for predicting long-term climate statistics and short-term weather outcomes. For example, long-term realistic weather statistics generation is 1 month to 100 years. The multivariate output for the long-term predictions has realistic statistical distributions, including extreme weather events. The short-term example includes short-term weather predictions of 1 day to 30 days. The short-term predictions of expected weather over time may be deterministic.

Loss functions may be included in the PINN-Based ROM 204 and may include data loss or partial differential equation (PDE) constraint loss. This includes additional improvements or novelty in that the loss calculation, or the loss computation is calculated for the state dynamics (i.e., full order solution) using physics-inspired constraints and for the latent dynamics (i.e., latent space) using data driven methods. Physics-inspired constraints may be applied to state dynamics and latent dynamics may be based on data, such as mean standard error or L2-norm. For example, the physics-inspired constraint is the residual of any partial differential equation that represents a dynamical system such as a plume model for atmospheric dispersion. Since the latent dynamics may not be known, the physics-informed constraints may be applied to the state dynamics and back propagated through the decoder to then be applied to the latent dynamics.

The loss functions or the data loss may include a loss in reconstruction, a loss in state dynamics, a loss in latent dynamics and a partial differential equation (PDE) loss. For example, the reconstruction loss is represented as $$\|x - \psi(z)\|_2^2,$$

the loss in state dynamics ($\dot{x}$) is represented as $$\lambda_1 \|\dot{x} - (\nabla_z \psi(z))\dot{z}\|_2^2,$$

the loss in the latent dynamics ($\dot{z}$) is represented as $$\lambda_2 \|(\nabla_x z)\dot{x} - \dot{z}\|_2^2$$

and the partial differential equation (PDE) loss is represented as $$\lambda_3 \|\mathcal{R}\|_2^2.$$

The loss functions may be represented as $$\|x - \psi(z)\|_2^2 + \lambda_1 \|\dot{x} - (\nabla_z \psi(z))\dot{z}\|_2^2 + \lambda_2 \|(\nabla_x z)\dot{x} - \dot{z}\|_2^2 + \lambda_3 \|\mathcal{R}\|_2^2.$$

The partial differential equation (PDE) loss may be defined by a partial differential equation (PDE) constraint. For example, partial differential equation (PDE) loss may be calculated using the advection-diffusion equation, $R=\partial_t C + \nabla \cdot (Cu) - \nabla(K \cdot \nabla C) - S$, where $C=C(x)$. The partial differential equation (PDE) loss may also be optimized to other loss functions, such as the Navier-Stokes equations, the Raleigh-Benard equations or convection, or the Boussinesq equation.

Figure 3:
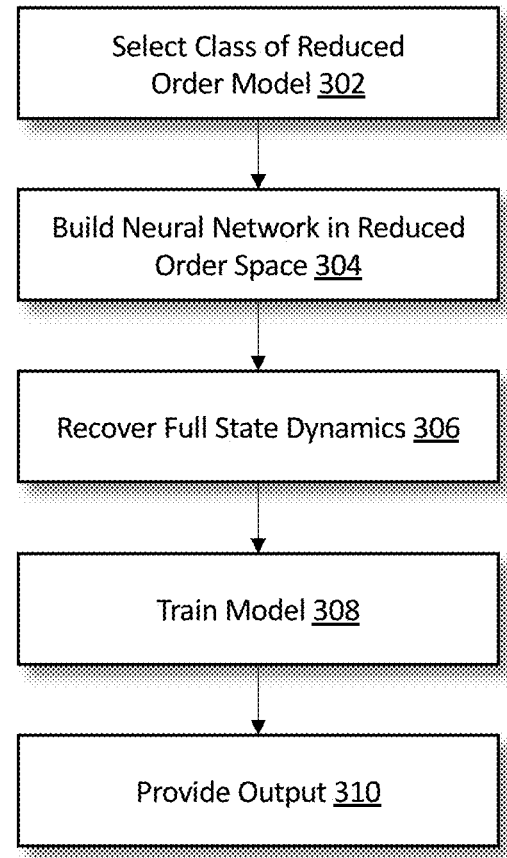
FIG. 3 is an operational flowchart illustrating a process for building a regionalized climate model using physics-informed neural networks in the latent space according to at least one embodiment.

Referring now to FIG. 3, an operational flowchart illustrating the exemplary regionalized climate model building process 300 used by the regionalized climate program 110*a*, 110*b* according to at least one embodiment is depicted. The regionalized climate model building process 300 may use physics-informed neural networks in the latent space, may predict latent space dynamics with physical constraints and may represent, translate and visualize the outputs. Additionally, the regionalized climate program 300 may predict weather or climate, or both, for global and regional global geographical areas and may predict long-term climate statistics and short-term weather outcomes.

At 302, a class of a reduced order model is selected. The class of the reduced order model may be selected based on the physics of the problem or the physics of the data (i.e., data physics), such as based on if the dynamical system is parabolic, hyperbolic or elliptical. The reduced order model may be used to obtain or to calculate latent dynamics. For example, proper orthogonal decomposition is used as a method to reduce the dimensionality of a spatiotemporal dataset. The reduced order model may include the components in the PINN-based ROM 204, such as an encoder and decoder (i.e., autoencoder) and a neural network to select a class of the reduced order model. For example, a class may include proper orthogonal decomposition, spectral proper orthogonal decomposition or autoencoders. A class may be selected by starting with a simple class of a reduced order model, such as a proper orthogonal decomposition. Next, autoencoders may be used as needed to predict target variables based on the skill of the system or the level of learning of the model.

According to an embodiment, the autoencoder may use nonlinear activation functions to encode the nonlinear properties of a dynamical system. An example of a dynamical system is the global atmospheric circulation. The autoencoder may be used to extract main features of a dynamical system in the latent space using the encoder and may recover the full state dynamics using the decoder.

At 304, a neural network is built in a reduced order space. A loss function may be selected for the reduced order space based on the physics of the problem or the physics of the data. The neural network may be built using a similar process as selecting the ROM, such as using an automatic hyperparameter optimization software framework. One example of a hyperparameter optimization software may include a framework such as Optuna. The neural network may also be built to predict a timeseries in the latent space, for example, using a long-short term memory recurrent neural network. The neural network may be deployed in the latent space to predict latent dynamics. Thus, no assumptions may be required relating to governing equations which is beneficial in complex systems, such as climate. The neural network may be used to predict the future timeseries of target variables in the reduced order space.

At 306, the full state dynamics are recovered. The loss function may be selected for the full order space (i.e., physics-inspired constraint). The loss functions may be included in or may be a part of the PINN-based ROM 204. The predicted full state dynamics is recovered using the reduced order model (ROM) decoder with the predicted time series and static basis functions of the reduced order model.

The physical constraints are selected based on the known partial differential equations that govern the weather system or the climate system, or both. The physical constraints may be used to drive the learning process of the model. A partial differential equation (PDE) based constraint may propagate physics from the full order space to the latent space using back propagation or automatic differentiation.

The partial differential equations (PDE) constraints may be encoded using back propagation to be consistent with dynamics in the latent space. In selecting the constraints, no assumptions may be required of the shape functions in the latent space. The back propagation or backwards propagation may be a training method for a neural network to evaluate the error function from the cost function. The error evaluated from the cost function may be propagated backwards through the neural network to update the neural network weights. For example, if the cost function includes information or data from the partial differential equations (PDEs), then the neural network remains consistent in the latent space. Including information or data from the partial differential equations (PDEs) may include the information about the physics of the system that is enforced during back propagation.

The shape functions may be determined by the neural network. The physics-informed partial differential equations (PDE) constraints may be included in the loss functions. The partial differential equations (PDE) loss may be computed for both the reconstructed state dynamics and the latent dynamics using back propagation through the decoder ($\psi$).

At 308, a model is trained. The model may be trained to predict long-term weather or climate statistics or short-term weather outcomes. The model may be trained to predict regional weather or climate and the output can be used as an input to downstream impact models. The predicted regional weather may include long-term weather statistics and the regional climate may include long-term climate statistics. The model being trained may include a high-resolution climate model (e.g., high-resolution long-term climate model 206).

For example, the PINN-based ROM 204 may be used to predict the weather, the climate, or both, for a region. The difference between the weather and the climate may be temporal. The weather may include short-term data and the model may provide short-term predictions, hours or weeks. The climate may include long-term data and the model may provide long-term predictions, such as months, decades or longer. An example incorporating a coarse resolution model (e.g., the coarse resolution climate model 202) may include predictions from a global climate model. The output of the coarse resolution model may be an input to the regionalized climate program 110a, 110b or the PINN-based ROM 204.

The model may be trained using dynamically created ontologies or knowledge graphs to represent or translate outputs of regionalized predictions. The model may be configured to downscale weather models and climate models. For example, the model or machine learning algorithms can be used to improved regionalized weather and climate data or information. Short-term deterministic predictions may be configured with appropriate initial conditions and boundary conditions. Long-term statistic predictions may be configured to match the climate system. The configuration of the model (e.g., to downscale or to forecast future conditions) may be determined by the feature or features and the target data. For example, if a short-term weather prediction is being determined, then the weather model data can be used as the feature inputs and target outputs. If climate statistics are being determined, then climate model data as inputs and outputs may be used.

At 310, outputs are provided. The trained model may provide representations, translations or visualizations, or a combination, of the outputs of the regionalized predictions and extremes for downstream impact models. The model output may provide a summarization of what is captured by the model based on deriving the interpretation of cause and effect from the latent space. The output may allow end users to interact with the model output without needing to run the model. For example, an end user may be able to find the effect of a rise in global temperature of x degrees on the average temperature of region R without actually running the model. The output may also provide a visualization of the learned latent space dynamics. For example, the spatial basis and timeseries in the latent space can be saved during model execution and then interrogated by a user utilizing the relevant decoder-encoder to discover the primary dynamical modes.

It may be appreciated that FIGS. 2 and 3 provide only an illustration of one embodiment and do not imply any limitations with regard to how different embodiments may be implemented. Many modifications to the depicted embodiment(s) may be made based on design and implementation requirements.

Figure 4:
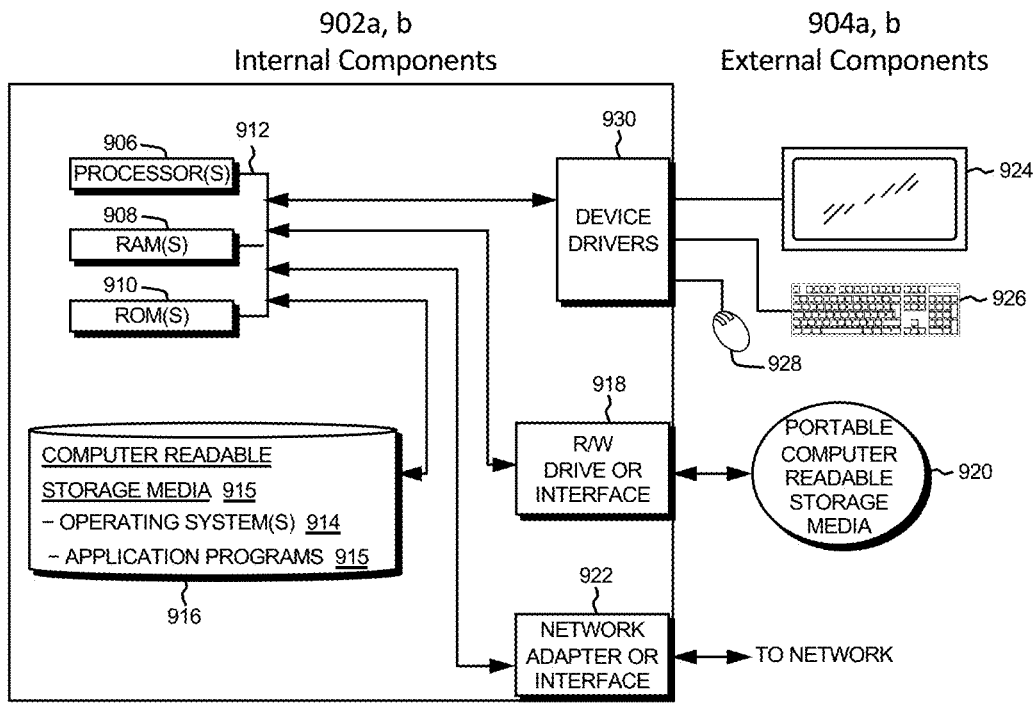
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

Computer 102 and server 112 may include respective sets of internal components 902a, b and external components 904a, b illustrated in FIG. 4. Each of the sets of internal components 902a, b includes one or more processors 906, one or more computer-readable RAMs 908 and one or more computer-readable ROMs 910 on one or more buses 912, and one or more operating systems 914, with one or more application programs 915 and one or more computer readable storage media 915. The one or more operating systems 914, the software program 108, and the regionalized climate program 110a in client computer 102, and the regionalized climate program 110b in network server 112, may be stored on one or more computer readable storage media 915 for execution by one or more processors 906 via one or more RAMs 908 (which typically include cache memory). In the embodiment illustrated in FIG. 4, each of the computer readable storage media 915 is a magnetic disk storage device of an internal hard drive. Alternatively, each of the computer readable storage media 915 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the regionalized climate program 110a, 110b can be stored on one or more of the respective portable computer-readable tangible storage devices 920, read via the respective RAY drive or interface 918 and loaded into the respective hard drive 916.

Each set of internal components 902a, b may also include network adapters (or switch port cards) or interfaces 922 such as a TCP/IP adapter cards, wireless wi-fi interface cards, or 3G/4G/5G wireless interface cards or other wired or wireless communication links. The software program 108 and the regionalized climate program 110a in the computer 102 and the regionalized climate program 110b in a network server 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the regionalized climate program 110a in computer 102 and the regionalized climate program 110b in network server computer 112 are loaded into the respective hard drive 916. The network may comprise copper wires, optical fibers, wireless transmission, routers, firewalls, switches, gateway computers and/or edge servers.

Each of the sets of external components 904a, b can include a computer display monitor 924, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure or on a hybrid cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (AaaS): the capability provided to the consumer is to use web-based or cloud-based networks (i.e., infrastructure) to access an analytics platform. Analytics platforms may include access to analytics software resources or may include access to relevant databases, corpora, servers, operating systems or storage. The consumer does not manage or control the underlying web-based or cloud-based infrastructure including databases, corpora, servers, operating systems or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
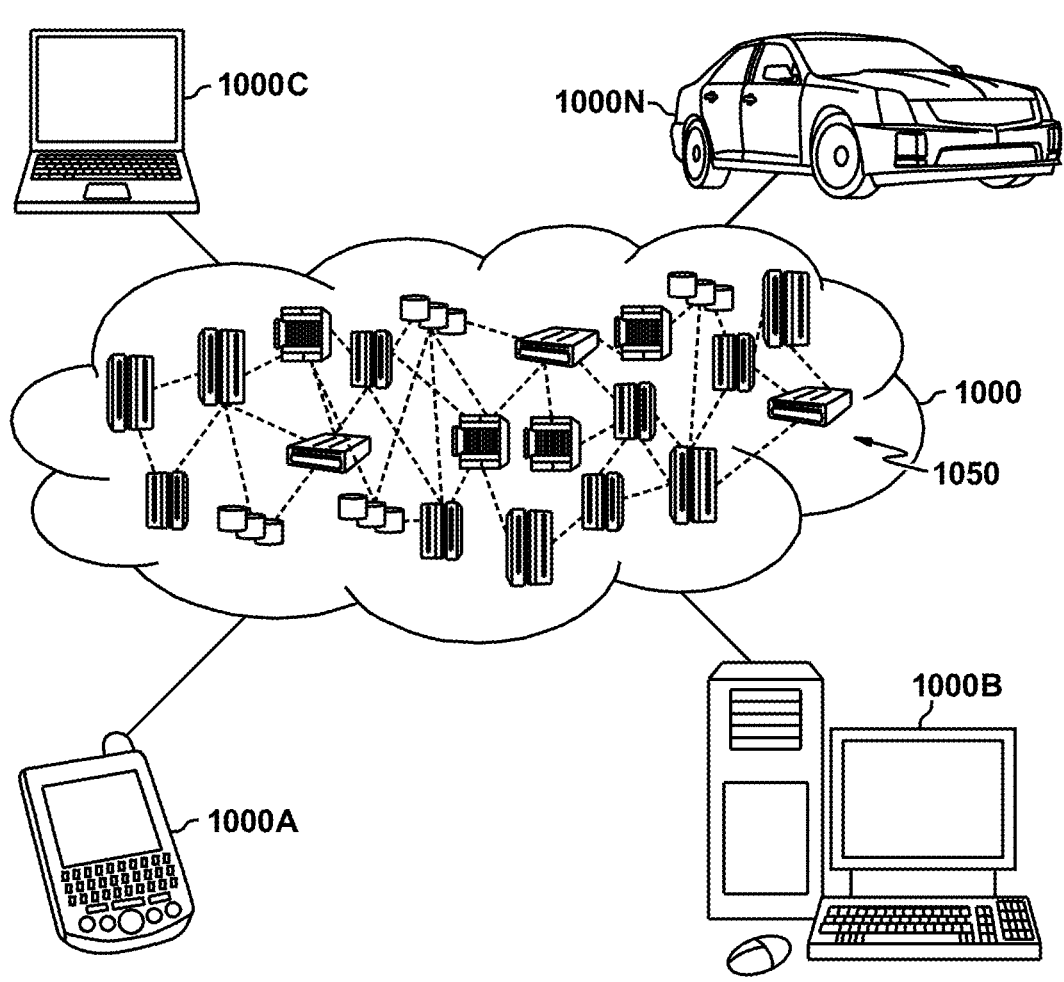
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, the cloud computing environment 1000 includes one or more cloud computing nodes 1050 with which local computing devices used by cloud consumers, such as, for example, personal digital assistant (PDA) or cellular telephone 1000A, desktop computer 1000B, laptop computer 1000C, and/or automobile computer system 1000N may communicate. Cloud computing nodes 1050 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 1050 and cloud computing environment 1000 can communicate with any type of computerized device over any type of network and/or network addressable connection (e.g., using a web browser).

Figure 6:
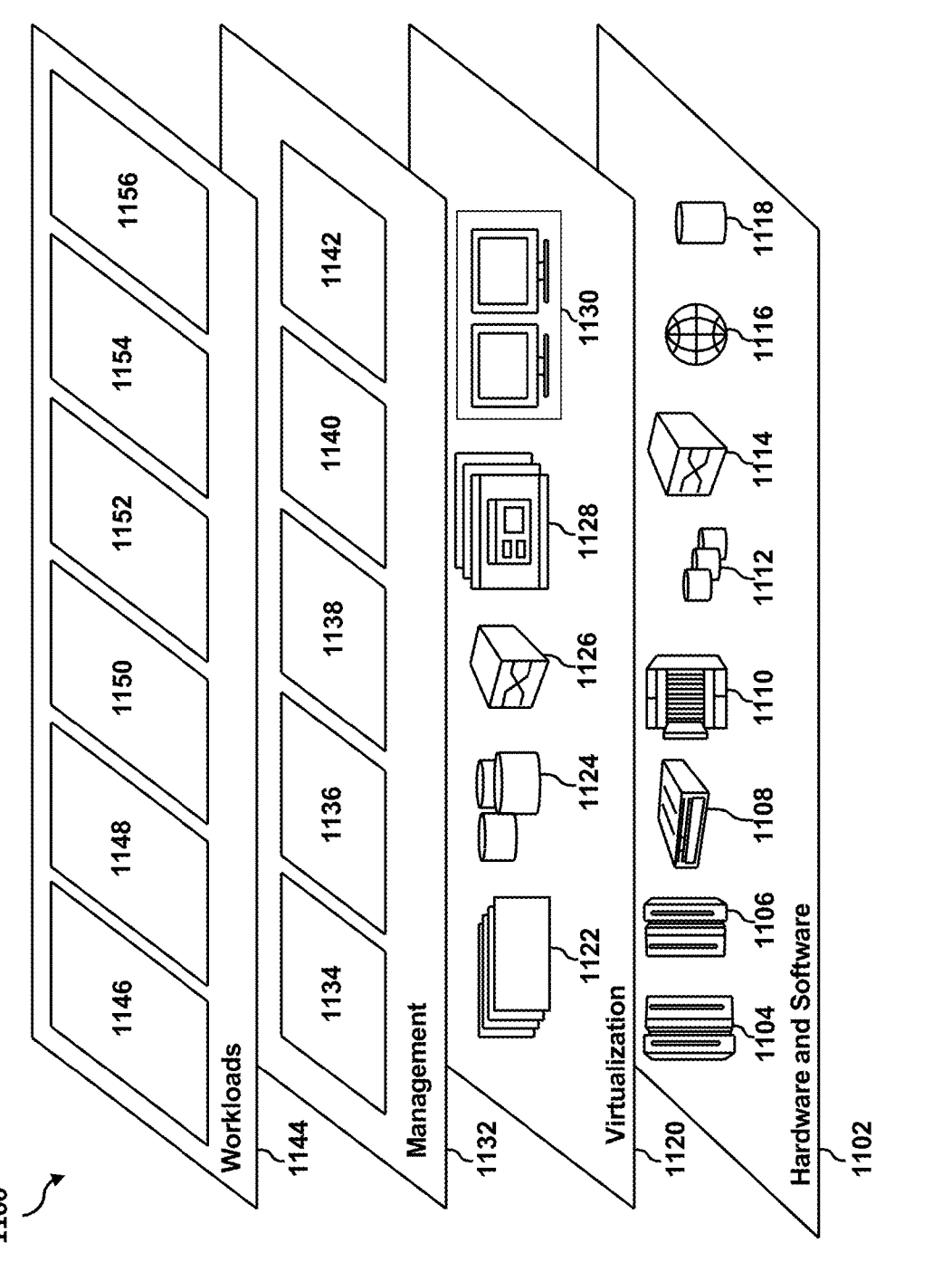
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

A hardware and software layer 1102 include hardware and software components. Examples of the hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, a management layer 1132 may provide the functions described below. Resource provisioning 1134 provides dynamic procurement of computing resources and other resources that are utilized to perform tasks within the cloud computing environment. Metering and pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions that may be provided from this layer include: mapping and navigation 1146; software development and lifecycle management 1148; virtual classroom education delivery 1150; data analytics processing 1152; transaction processing 1154; and regionalized climate models 1156. A regionalized climate program 110*a*, 110*b* provides a way to create improved regionalized climate models using physics-informed neural networks in the latent space.

The present invention may be a system, a method, and/or a computer program product at any possible technical detail level of integration. The computer program product may include a computer readable storage media 915 (or media) having computer readable program instructions thereon for causing a processor 906 to carry out aspects of the present invention.

The computer readable storage media 915 can be a tangible device that can retain and store instructions for use by an instruction execution device. The computer readable storage media 915 may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage media 915 includes the following: a portable computer diskette, a hard disk, a random access memory (RAM) 908, a read-only memory (ROM) 910, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage media 915, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage media 915 or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface 922 in each computing/processing device receives computer readable program instructions from the network and forwards the computer readable program instructions for storage in a computer readable storage media 915 within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, python programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor 906 of a general purpose computer, special purpose computer, or other programmable data processing apparatus to produce a machine, such that the instructions, which execute via the processor 906 of the computer or other programmable data processing apparatus, create means for implementing the functions/acts specified in the flowchart and/or block diagram block or blocks. These computer readable program instructions may also be stored in a computer readable storage media 915 that can direct a computer, a programmable data processing apparatus, and/ or other devices to function in a particular manner, such that the computer readable storage media 915 having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for creating improved regionalized climate models using physics-informed neural networks in a latent space, the method comprising:

selecting a class of a reduced order model, the reduced order model a physics-informed neural network for reduced order modeling, the reduced order model including an encoder, a decoder, and physics informed-constraints;

building a neural network in a reduced order space;

recovering full state dynamics using the decoder of the reduced order model, recovering the full state dynamics including selecting a loss function for a full order space, the loss function related to the built neural network;

training a model using ontologies or knowledge graphs, the model trained to predict weather or provide climate statistics; and providing an output.

2. The method of claim 1, wherein the class is selected based on physics of the data.

3. The method of claim 1, wherein a loss function is selected for the reduced order space based on physics of the data.

4. The method of claim 1, wherein recovering the full state dynamics includes selecting physical constraints based on known partial differential equations that govern a weather system or a climate system.

5. The method of claim 1, wherein the output provides a summarization of the model based on deriving an interpretation of a cause and an effect from the latent space.

6. The method of claim 1, wherein the neural network is associated with hyperparameters, the hyperparameters selected using a hyperparameter optimization software framework.

7. A computer system for creating improved regionalized climate models using physics-informed neural networks in a latent space, comprising:

one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:

selecting a class of a reduced order model, the reduced order model a physics-informed neural network for reduced order modeling, the reduced order model including an encoder, a decoder, and physics informed-constraints;

building a neural network in a reduced order space;

recovering full state dynamics using the decoder of the reduced order model, recovering the full state dynamics including selecting a loss function for a full order space, the loss function related to the built neural network;

training a model using ontologies or knowledge graphs, the model trained to predict weather or provide climate statistics; and providing an output.

8. The computer system of claim 7, wherein the class is selected based on physics of the data.

9. The computer system of claim 7, wherein a loss function is selected for the reduced order space based on physics of the data.

10. The computer system of claim 7, wherein recovering the full state dynamics includes selecting physical constraints based on known partial differential equations that govern a weather system or a climate system.

11. The computer system of claim 7, wherein the output provides a summarization of the model based on deriving an interpretation of a cause and an effect from the latent space.

12. A computer program product for creating improved regionalized climate models using physics-informed neural networks in a latent space, comprising:

one or more computer-readable tangible storage media and program instructions stored on at least one of the one or more computer-readable tangible storage media, the program instructions executable by a processor to cause the processor to perform a method comprising:

selecting a class of a reduced order model, the reduced order model a physics-informed neural network for reduced order modeling, the reduced order model including an encoder, a decoder, and physics informed-constraints;

building a neural network in a reduced order space;

recovering full state dynamics using the decoder of the reduced order model, recovering the full state dynamics including selecting a loss function for a full order space, the loss function related to the built neural network;

training a model using ontologies or knowledge graphs, the model trained to predict weather or provide climate statistics; and providing an output.

13. The computer program product of claim 12, wherein the class is selected based on physics of the data.

14. The computer program product of claim 12, wherein a loss function is selected for the reduced order space based on physics of the data.

15. The computer program product of claim 12, wherein recovering the full state dynamics includes selecting physical constraints based on known partial differential equations that govern a weather system or a climate system.

* * * * *